United States Patent
Blakelock et al.

(10) Patent No.: US 6,331,745 B2
(45) Date of Patent: *Dec. 18, 2001

(54) ADJUSTABLE GENERATOR STATOR SLOT WEDGE SYSTEM

(75) Inventors: Thomas R. Blakelock, Clifton Park; Thomas R. Butman, Jr., Delmar; Alan M. Iversen, Clifton Park, all of NY (US)

(73) Assignee: General Electric Company, Schenectady, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 15 days.

(21) Appl. No.: 09/444,677

(22) Filed: Nov. 22, 1999

(51) Int. Cl.$^7$ ........................................ H02K 3/48
(52) U.S. Cl. ............................. 310/214; 310/254
(58) Field of Search ..................... 310/214, 254; 29/596

(56) References Cited

U.S. PATENT DOCUMENTS

| | | | |
|---|---|---|---|
| 3,391,294 | * 7/1968 | Moxie | 310/214 |
| 3,624,432 | * 11/1971 | Merz | 310/53 |
| 3,842,303 | * 10/1974 | Simmonds et al. | 310/260 |
| 3,909,931 | * 10/1975 | Lambrecth | 29/596 |
| 3,949,255 | * 4/1976 | Brown et al. | 310/214 |
| 4,149,101 | 4/1979 | Lesokhin et al. | 310/214 |
| 4,200,818 | * 4/1980 | Ruffing et al. | 310/214 |
| 4,547,690 | * 10/1985 | Bath et al. | 310/214 |
| 4,572,980 | * 2/1986 | Anderson et al. | 310/214 |
| 4,584,497 | * 4/1986 | Butman, Jr. et al. | 310/214 |
| 4,607,183 | * 8/1986 | Rieber et al. | 310/214 |
| 4,633,574 | * 1/1987 | Bath et al. | 29/596 |

* cited by examiner

*Primary Examiner*—Joseph Waks
(74) *Attorney, Agent, or Firm*—Nixon & Vanderhye P. C.

(57) ABSTRACT

A generator stator includes a magnetic core having a plurality of axially extending radial slots arranged about the periphery thereof with stator windings in each radial slot. At least one adjustable assembly is located in an axially outermost end of each radial slot, arranged to apply radial force to the windings in the radial slot, the adjustable assembly including mating wedge and slide components which interface along stepped matching surfaces which lie at an acute angle to a center axis of the magnetic core. The assembly is adjustable in situ to compensate for decreases in radial pressure with time while stepped contacting surfaces of the wedge and slide prevent axial regression of the slide.

12 Claims, 3 Drawing Sheets

ADJUSTABLE GENERATOR STATOR SLOT WEDGE SYSTEM

BACKGROUND OF THE INVENTION

This invention relates to generator stators and, more specifically, to a wedge and slide system used at the ends of the stator core. The wedge and slide system is adjustable to permit in situ radial correction for radial pressure and dimension losses which occur over time.

Electric utility companies require large turbine-generators to operate reliably for long periods of time, for example, thirty years or more. Normal, steady-state electromagnetic forces acting on the armature winding are capable of causing armature bar vibration within a much shorter period than the expected generator lifetime. Armature bar vibration can occur if radial clearances are present within the stator core slot. Bar vibration can result in armature bar insulation abrasion. The abrasion can become severe if maintenance actions are not taken to retighten the slot support system and arrest the vibration. Typically, a prolonged maintenance outage is required to retighten the slot support system and eliminate radial clearances within the slot.

The electrical windings at opposite axial ends of the stator core slots may be particularly susceptible to accelerated abrasion due to: 1) pre-existing or rapidly-evolving radial clearances, 2) the effects of excessive or continuous oil contamination, 3) the effects of end winding electromagnetic forces, and 4) abnormally-high electromagnetic design forces on the slot portion of the winding. It is therefore important to provide an in situ means for eliminating radial clearances that develop in this location in order to prevent unscheduled or prolonged service outages.

In an attempt to address these problems, a stepped wedge and slide arrangement is proposed in U.S. Pat. No. 4,149,101 but for the purpose of preventing axial displacement of wedges within the core slot. A stepped bracing arrangement is proposed in U.S. Pat. No. 3,842,303 but in the context of an end winding support fit-up device between the coil end arms.

BRIEF SUMMARY OF THE INVENTION

The present invention seeks to provide a stepped dovetail wedge and slide system which permits re-tightening of generator stator end-of-slot wedges (or simply, end wedges), restoring the required radial force on the winding bars in a location where loosening is most likely to occur. Significantly, the re-tightening process can be carried out without removal or replacement of parts, and without removal of the generator field. The invention also increases the long-term durability and reliability of the end wedges by making design and materials improvements, and hence contributes to a decrease in the frequency of generator inspection outages.

Accordingly, the present invention relates to a dovetail wedge and slide combination that can be used at the ends of the stator core, and that has matching inclined surfaces that are stepped to permit in situ radial correction for any radial pressure and dimension losses which occur over time, and to prevent axial regression of the slide after adjustment. The invention is preferably applied to large turbine generator stators that have relatively high electromagnetic forces during normal operation and, in some cases, have exhibited the development of radial clearance in the windings at the ends of the core and subsequent end wedge loosening.

More specifically, the invention provides an adjustable version of a restraining device commonly referred to as a "stator slot wedge" that has the primary purpose of supplying a radial force to the armature winding (stator bars) to prevent it from vibrating under the influence of electromagnetic forces experienced continuously during normal operation, and which can become much more severe under conditions caused by misoperation or system faults. There are several features which, in combination, yield a unique support device, the main feature of which is adjustable tightening of the wedges in place, while also increasing the radial force on the stator bar.

In accordance with one embodiment of the invention, matching stepped contact planes are machined on the sloped surfaces of the slide and dovetail wedge components. In the initially installed condition, the slide is driven tight to provide the required radial force on the bars, but with the capacity to be driven an additional distance in the axial direction, as needed at later dates, to eliminate radial clearances and to restore radial wedge force.

In the preferred arrangement, the stepped surface is machined on the sloped side of a slide component, made from a high strength laminate. The wedge is formed by laminating a slide component to a flat slidable dovetail piece made from a non-abrasive laminate. The non-abrasive portion of the wedge is the only part of the wedge-slide system in contact with the iron thus eliminating core wear.

In another variation, the wedge component can be composed of a high strength laminate, which may be abrasive, but to which non-abrasive strips or pads have been bonded on any surface in contact with the core.

A further enhancement of the invention is achieved by designing the end wedge to incorporate a device which can be used to tighten the next axially inboard wedge. This involves drilling through the end wedge in an axial direction to allow insertion of a movable part such as a hard, non-metallic dowel which can be positioned to contact the outboard end of the next adjacent slide. The outboard end of the dowel can then be driven inwardly if needed at the same time the end slide is adjusted. The thickness of the end wedge may be increased if necessary to accommodate the dowel pin without sacrificing radial strength. The sloped surfaces of the next adjacent inboard wedge and slide are also stepped (as in the case of the end wedge and slide) to permit adjustable tightening and to prevent axial regression of the slide after adjustment. This arrangement allows radial load adjustment over a greater axial length and compensates for any loosening of the inboard wedge caused by re-tightening the end wedge.

Accordingly, in its broader aspects, the present invention relates to a generator stator including a magnetic core having a plurality of axially extending radial slots arranged about the periphery thereof with stator windings in each radial slot; at least one adjustable assembly in an axially outermost end of each radial slot, arranged to restrain the windings in the radial slot, the adjustable assembly comprising mating wedge and slide components which interface along stepped matching surfaces which lie at an acute angle to a center axis of the magnetic core.

DETAILED DESCRIPTION OF THE INVENTION

Figure 1:
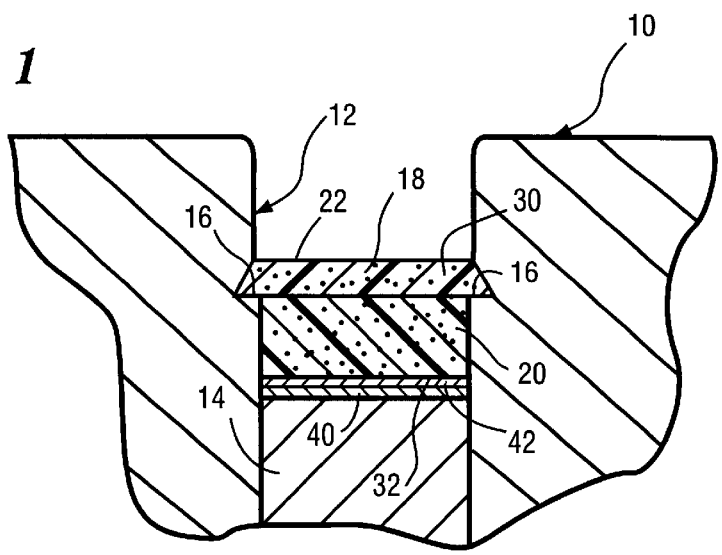
FIG. 1 is a partial end view of a stator core slot with slide and wedge components in place, so as to supply radial forces to the armature winding or stator bars.

Referring to FIG. 1, the stator core is partially shown at 10, it being understood that the core includes a plurality of radial slots 12 which extend axially along the core and which receive stator windings 14. Each slot 12 is formed adjacent its mouth with dovetail grooves or undercuts 16, permitting wedge and slide components 18, 20 to be inserted in an axial direction within the slot.

For each radial slot, two sets of wedge and slide components 18, 20 are employed at opposite ends of the stator core. More specifically, conventional wedges or components are inserted from the axial center of the core outwardly in opposite directions. In this regard, individual wedges are generally between about 4 and 7 inches in length, and the stator core may have a length of between about 60 and 330 inches. The final two axially adjacent wedge locations at respective opposite ends of the core are fitted with the wedge and slide assemblies 18, 20 described in greater detail below.

Figure 2A:
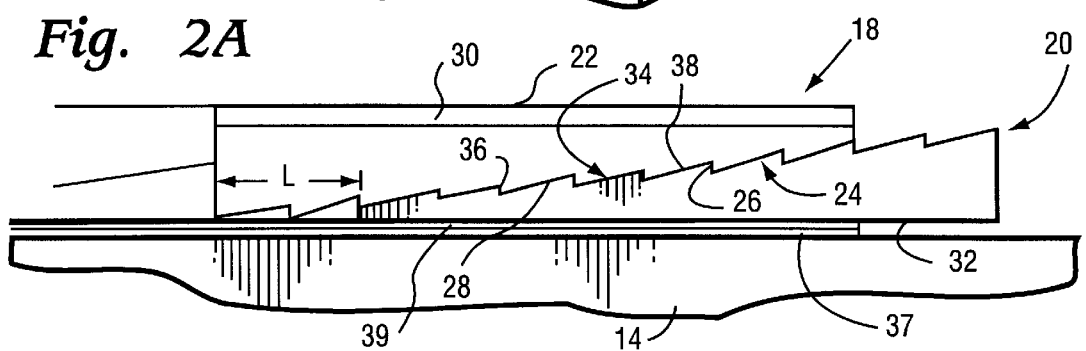
FIG. 2A is partial side elevation of wedge and slide components in their initially installed condition.

With reference also to FIG. 2A, the wedge 18 is formed with a flat top surface 22 and an inclined or sloped lower surface 24 machined to include a series of integral steps of defined by vertical shoulders 26 which connect adjacent inclined surface portions 28, with the wedge increasing in thickness in an "inward direction", i.e., in the insertion direction toward the axial center of the core 10. Along the axially extending sides of the upper portion of the wedge, there are laterally extending dovetail projections 30 which mate with the dovetail grooves 16 in the slot 12.

The slide component 20 has a flat bottom surfaces 32 and an inclined or sloped upper surface 34 machined to include a series of steps (i.e., 22 and 34 are stepped matching surfaces) defined by vertical shoulders 36 which connect adjacent inclined ramp portions 38, with the slide decreasing in thickness in the "inward" or insertion direction. The slide 20 is preferably a high strength laminate. The wedge and slide components 18, 20 thus interface along matching stepped contact planes (the inclined surface portions 28 and 38 are equal in length and have the same slope). Surface portions 28, 38 lie at an acute angle to the center axis of the core. It is preferred that this angle lie in the range of from about 3° to about 8°. Between the winding 14 and the slide 20, there are one or more axially filler strips 37, 39.

To facilitate the description of the invention, using the bottom of the radial slot 12 as a reference, the wedge component 18 lies radially outwardly of the slide component 20.

During assembly, after the conventional interior wedges have been inserted in the usual manner, the axially outer wedge and slide components are inserted in the slot 12, with the wedge 18 inserted first, supported by the dovetail grooves 16. With the filler strips 37, 39 located atop the winding 14, the slide 20 is inserted axially as shown in FIG. 2A, i.e., radially between the wedge 18 and the windings 14. As shown there, the slide 20 is driven tight in the axial direction to provide the required radial force on the winding bars, but with the capability to be driven axially an additional distance L, as needed at later dates, to eliminate radial clearances and to restore radial wedge force.

Figure 2B:
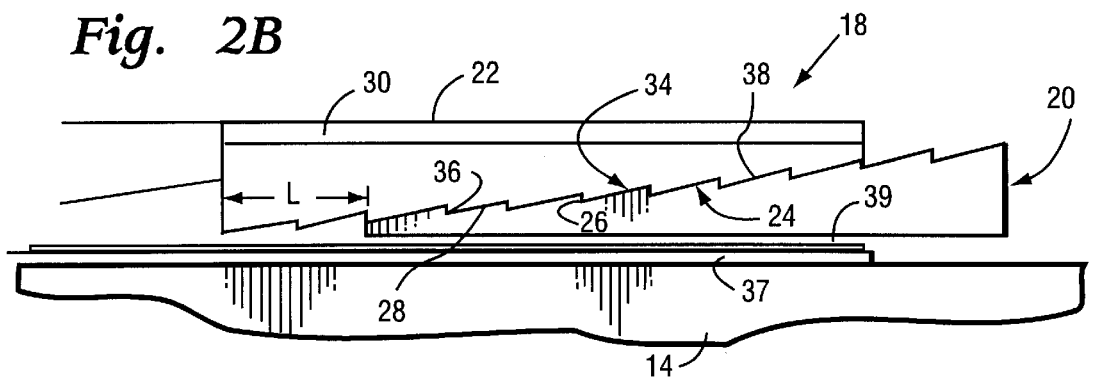
FIG. 2B is a view similar to FIG. 2A but with the slide and wedge components in a loosened condition.

In FIG. 2B, the slide and wedge assembly is shown in a loosened condition where radial clearances have developed in the slot as a result of bar and wedge shrinkage and compaction over time. Of course, the stepped configuration between the slide and wedge prevents the slide from "backing out" of the slot even though radial clearances have developed.

Figure 2C:
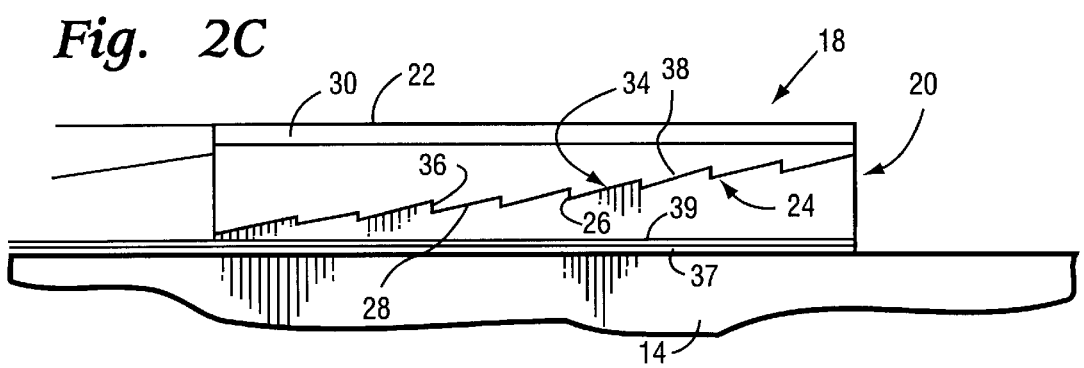
FIG. 2C is a section similar to FIGS. 2A and 2B but with the slide component driven fully under the wedge component in order to correct the loosened condition shown in FIG. 2B.

FIG. 2C illustrates a corrected and tightened condition where the slide 20 can be driven axially further into the slot up to the distance L, until the forward and rearward ends of the wedge and slide lie flush with one another. It will be understood that the depiction in FIGS. 2A–2C is schematic in nature and does not reflect the exact step size, slope, or axial travel.

Figure 3:
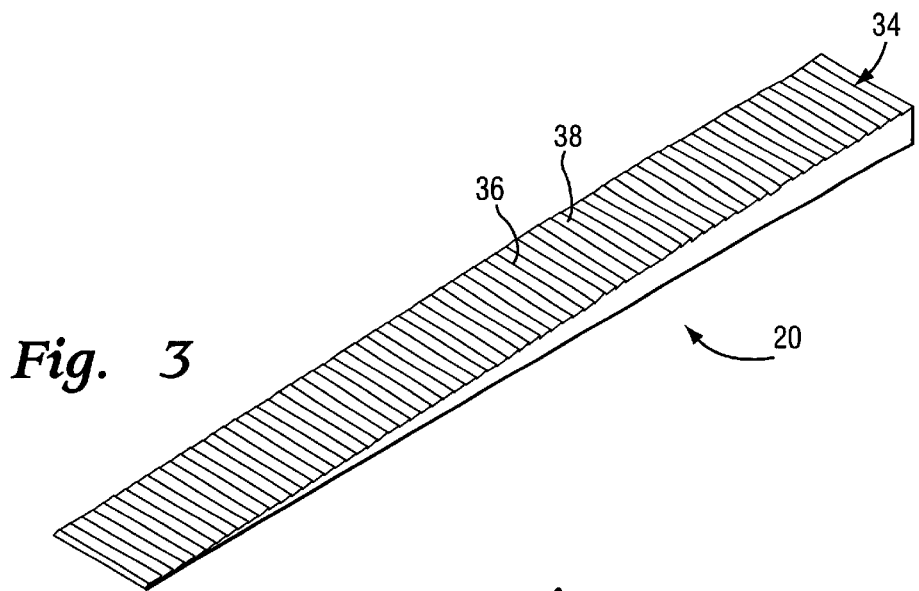
FIG. 3 is a perspective view of a slide component which illustrates the manner in which the stepped surface can be machined or molded into a discrete part.

FIG. 3 illustrates the slide component 20 as also shown in FIGS. 2A, B and C, and the manner in which the upper surface 34 is machined or otherwise formed to include integral shoulders 36 and inclined ramp surfaces 38.

Figure 4:
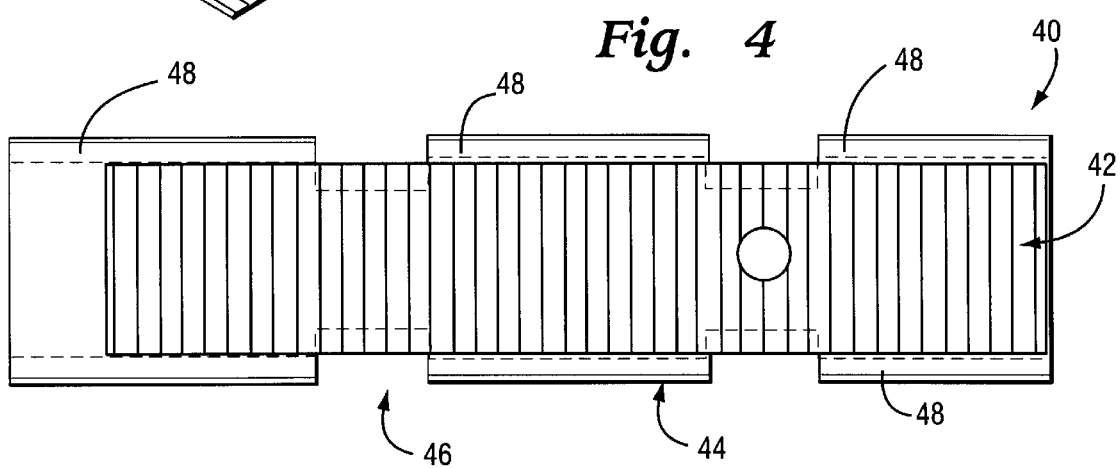
FIG. 4 is a bottom plan view of a composite laminate wedge component with a non-abrasive flat dovetail bonded to a discrete component having a machined or molded stepped surface in accordance with the invention.
Figure 5:
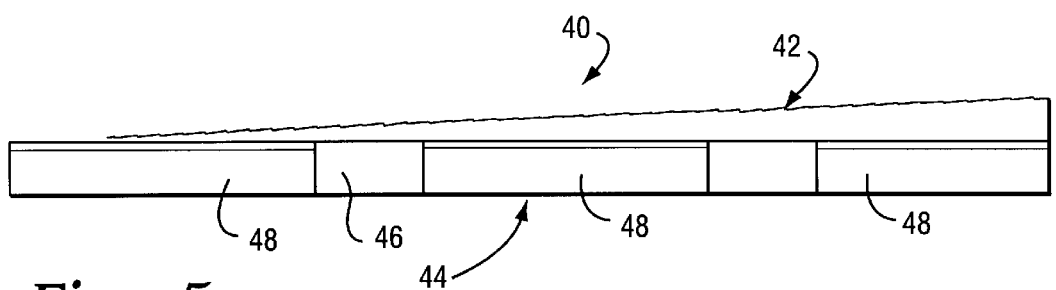
FIG. 5 is a side elevation of the composite wedge shown in FIG. 4.

FIG. 4 shows an alternative and presently preferred embodiment for the wedge and slide components, although only the wedge component is shown in FIGS. 4 and 5. The wedge component 40 comprises discrete bonded laminate portions including a stepped wedge part 42 and a flat part 44 bonded thereto. Note that FIG. 4 illustrates the wedge component viewed from below and FIG. 5 shows the wedge component inverted relative to its installation orientation as shown in FIGS. 1 and 2A–2C. The flat part 44 includes laterally extending dovetail portions 48 with a pair of notches or cut-outs 46 on each side thereof. These notches are intended to align with ventilation ducts but are otherwise not significant to this invention.

Figure 6:
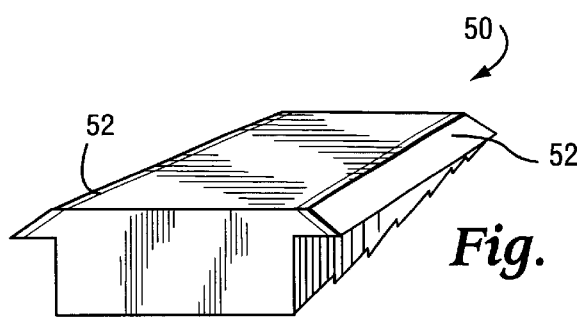
FIG. 6 is a perspective view of an alternative wedge component in which the stepped surface can be machined or molded into a wedge body fitted with longitudinally extending non-abrasive pads.

Turning to FIG. 6, a wedge component 50 is shown which is generally similar to that shown in FIG. 1 but with the addition of nonabrasive pads 52 on the dovetail portion of the wedge. The non-abrasive pads can be made from a laminated material such as which minimizes stator core wear but permits the main body of the wedge to be constructed of a higher strength and possibly abrasive material.

Figure 7:
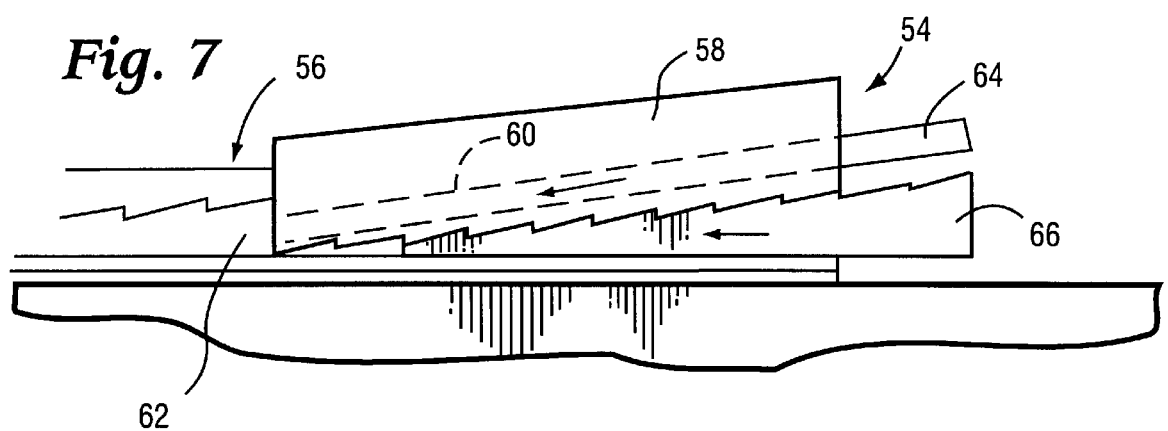
FIG. 7 is a partial side elevation view illustrating an alternative arrangement wherein a dowel is slidably engaged within the outboard wedge for the purpose of tightening a next adjacent inboard wedge.
Figure 8:
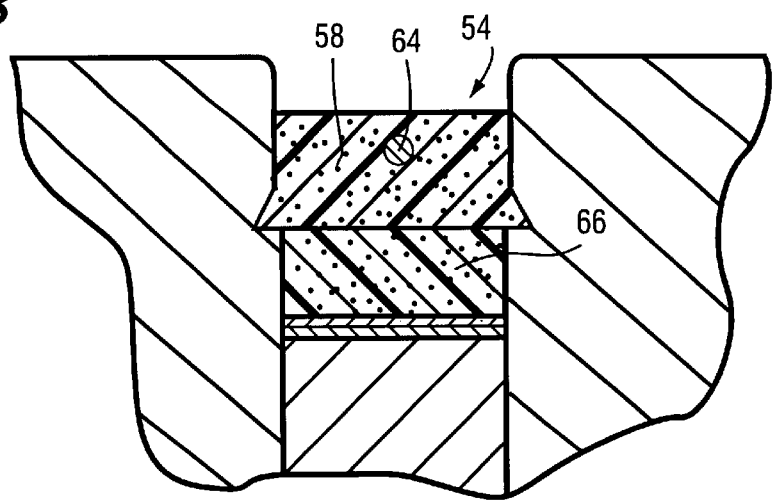
FIG. 8 is an end view of the arrangement shown in FIG. 7.

In still another embodiment, as illustrated in FIGS. 7 and 8, the outside or end wedge/slide assembly 54 can be used to tighten the next inboard wedge/slide assembly 56. This can be done, for example, by drilling through the end wedge 58 to provide a bore 60 generally parallel to the top surface, and at a location which insures that the bore lie adjacent the next inboard slide member 62. A hard non-metallic dowel 64 can then be positioned within the bore 60 so as to contact the trailing edge of the adjacent slide 62. The outboard end of the dowel 64 can be driven axially inwardly (for example, at the same time that the end slide 66 is adjusted) as described above. If necessary, the thickness of the end wedge 58 can be increased to accommodate the utilization of the dowel 64 without sacrificing radial strength. Moreover, the sloped surfaces of the next adjacent inboard wedge and slide assembly 54 are also stepped to permit adjustable tightening and to prevent axial regression of the slide. This arrangement allows radial load adjustment over a greater axial length and compensates for any loosening of the inner wedge caused by increasing the load on the end wedges.

As will be appreciated by those of ordinary skill in the art, the utilization of a permanently installed dowel 64 could be eliminated in favor of simply providing the bore 60 and then employing an appropriate rod-like tool whenever necessary.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A generator stator including a magnetic core having a plurality axially extending radial slots arranged about the periphery thereof with windings in each of said radial slots; at least one adjustable assembly in an axially outermost end of said each slot, arranged to restrain said windings in said radial slot, said adjustable assembly comprising mating components including a wedge component and a slide component which interface along stepped matching surfaces formed on respective sloped sides of each of said wedge component and said slide component, said sloped side surfaces lying at an acute angle to a center axis of the magnetic core, said wedge component slidably received in a pair of dovetail grooves in said radial slot, said slot component located radially inwardly of said wedge component.

2. The generator stator of claim 1 wherein, relative to a bottom of said radial slot, said wedge component lies radially outwardly of said slide component and wherein said wedge component and said radial slot have mating surfaces which prevent radial outward movement of said wedge component, and wherein said slide component is axially driveable into a first position between said stator winding and said wedge component.

3. The generator stator of claim 2 wherein upon loosening of said stator windings, said slide component is axially driveable into a second position beyond said first position.

4. The generator stator of claim 1 wherein a second adjustable assembly is located axially inboard of said at least one adjustable assembly.

5. The generator stator of claim 4 wherein a dowel extends substantially axially through said wedge component of said one adjustable assembly into engagement with a slide component of said second adjustable assembly.

6. The generator stator of claim 1 wherein said wedge component is fitted with non-abrasive pads along surfaces of said wedge component received in said dovetail groove.

7. The generator stator of claim 1 wherein the stepped surfaces of said wedge and slide components are formed as discrete parts.

8. A generator stator including a magnetic core having a plurality of axially extending radial slots arranged about the periphery thereof with stator windings in each of said radial slots; at least one adjustable assembly end of said each slot, arranged to restrain said windings in said radial slot, said adjustable assembly comprising mating components including a wedge component and a slide component which interface along stepped matching surfaces which lie at an acute angle to a center axis of the magnetic core, wherein said wedge component comprises a pair of bonded laminates including a first component having a stepped surface and a second component having a doetail adapted to be slidably received in mating dovetail grooves formed in said radial slot.

9. The generator stator of claim 8 wherein, relative to a bottom of said radial slot, said wedge component lies radially outwardly of said slide component and wherein said slide component is axially driveable into a first position between said stator bar and said wedge component.

10. The generator stator of claim 9 wherein upon loosening of said stator windings, said slide component is axially driveable into a second position beyond said first position.

11. The generator stator of claim 10 wherein a second adjustable assembly is located axially inboard of said at least one adjustable assembly.

12. The generator stator of claim 11 wherein a dowel extends substantially axially through said wedge component of said first adjustable assembly into engagement with a slide component of said second adjustable assembly.

* * * * *